(12) United States Patent
Wang

(10) Patent No.: US 7,916,378 B2
(45) Date of Patent: Mar. 29, 2011

(54) METHOD AND APPARATUS FOR PROVIDING A LIGHT ABSORBING MASK IN AN INTERFEROMETRIC MODULATOR DISPLAY

(75) Inventor: Chun-Ming Albert Wang, Fremont, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 52 days.

(21) Appl. No.: 11/683,787

(22) Filed: Mar. 8, 2007

(65) Prior Publication Data

US 2008/0218834 A1 Sep. 11, 2008

(51) Int. Cl.
*G02F 1/03* (2006.01)
*G02B 26/00* (2006.01)
*G02B 26/08* (2006.01)

(52) U.S. Cl. .................. 359/247; 359/290; 359/198

(58) Field of Classification Search .......... 359/247, 359/245, 260–261, 298, 301–303, 317–318, 359/577, 290–292, 223–225, 262–263, 295, 359/198
See application file for complete search history.

(56) References Cited

U.S. PATENT DOCUMENTS

| | | |
|---|---|---|
| 3,247,392 A | 4/1966 | Thelen |
| 3,701,586 A | 10/1972 | Goetz |
| 3,886,310 A | 5/1975 | Guldberg |
| 4,087,810 A | 5/1978 | Hung et al. |
| 4,421,381 A | 12/1983 | Ueda |
| 4,441,791 A | 4/1984 | Hornbeck |
| 4,560,435 A | 12/1985 | Brown et al. |
| 4,655,554 A | 4/1987 | Armitage |
| 5,034,351 A | 7/1991 | Sun et al. |
| 5,142,414 A | 8/1992 | Koehler |
| 5,337,191 A | 8/1994 | Austin |
| 5,422,310 A | 6/1995 | Ito |
| 5,457,900 A | 10/1995 | Roy et al. |
| 5,550,373 A | 8/1996 | Cole |
| 5,638,084 A | 6/1997 | Kalt |
| 5,796,378 A | 8/1998 | Yoshida |
| 5,818,095 A | 10/1998 | Sampsell |
| 5,835,256 A | 11/1998 | Huibers |
| 5,867,301 A | 2/1999 | Engle |
| 5,894,686 A | 4/1999 | Parker et al. |

(Continued)

FOREIGN PATENT DOCUMENTS

EP 1 030 340 8/2000

(Continued)

OTHER PUBLICATIONS

IPRP for PCT/US08/055829 filed Mar. 4, 2008.

(Continued)

*Primary Examiner* — Ricky L Mack
*Assistant Examiner* — Dawayne A Pinkney
(74) *Attorney, Agent, or Firm* — Knobbe Martens Olson & Bear, LLP

(57) ABSTRACT

A microelectromechanical system (MEMS) is provided. In one embodiment, the MEMS includes a transparent substrate, and a plurality of interferometric modulators. The plurality of interferometric modulators includes an optical stack coupled to the transparent substrate, in which the optical stack includes a first light absorbing area. The plurality of interferometric modulators further includes a reflective layer over the optical stack, and one or more posts to support the reflective layer. Each of the one or more posts includes a second light absorbing area integrated in the post.

25 Claims, 12 Drawing Sheets

U.S. PATENT DOCUMENTS

| | | |
|---|---|---|
| 5,920,417 A | 7/1999 | Johnson |
| 5,959,777 A | 9/1999 | Whitehead |
| 6,040,937 A | 3/2000 | Miles |
| 6,100,861 A | 8/2000 | Cohen et al. |
| 6,123,431 A | 9/2000 | Teragaki et al. |
| 6,262,696 B1 | 7/2001 | Seraphim et al. |
| 6,282,010 B1 | 8/2001 | Sulzbach et al. |
| 6,356,378 B1 | 2/2002 | Huibers |
| 6,377,233 B2 | 4/2002 | Colgan |
| 6,377,321 B1 | 4/2002 | Khan et al. |
| 6,392,618 B1 | 5/2002 | Kimura et al. |
| 6,518,944 B1 | 2/2003 | Doane et al. |
| 6,519,073 B1 | 2/2003 | Goossen |
| 6,597,490 B2 | 7/2003 | Tayebati |
| 6,650,455 B2 | 11/2003 | Miles |
| 6,657,386 B2 | 12/2003 | Koshio et al. |
| 6,674,562 B1 | 1/2004 | Miles et al. |
| 6,683,693 B1 | 1/2004 | O'Tsuka |
| 6,715,889 B2 | 4/2004 | Nishima et al. |
| 6,741,377 B2 * | 5/2004 | Miles ............ 359/243 |
| 6,753,937 B2 | 6/2004 | Grupp |
| 6,778,034 B2 | 8/2004 | Nir et al. |
| 6,784,956 B2 | 8/2004 | Matsumoto et al. |
| 6,844,959 B2 * | 1/2005 | Huibers et al. ........ 359/297 |
| 6,880,959 B2 | 4/2005 | Houston |
| 6,882,461 B1 | 4/2005 | Tsai |
| 6,885,409 B2 | 4/2005 | Stephenson et al. |
| 6,891,588 B2 | 5/2005 | Kawachi et al. |
| 6,930,816 B2 | 8/2005 | Mochizuki |
| 7,019,809 B2 | 3/2006 | Sekiguchi |
| 7,042,625 B2 | 5/2006 | Hong et al. |
| 7,061,678 B1 | 6/2006 | Chikazawa |
| 7,123,216 B1 | 10/2006 | Miles |
| 7,126,738 B2 | 10/2006 | Miles |
| 7,135,643 B2 | 11/2006 | van Haaster et al. |
| 7,184,202 B2 | 2/2007 | Miles et al. |
| 7,236,284 B2 | 6/2007 | Miles |
| 7,265,809 B2 | 9/2007 | Dunn et al. |
| 7,277,143 B2 | 10/2007 | Funahata et al. |
| 7,298,437 B2 | 11/2007 | Edwards et al. |
| 7,310,121 B2 | 12/2007 | Hirakata et al. |
| 7,321,457 B2 | 1/2008 | Heald |
| 7,324,176 B2 | 1/2008 | Dunn et al. |
| 7,349,141 B2 | 3/2008 | Tung et al. |
| 7,403,180 B1 | 7/2008 | Silverstein et al. |
| 7,420,725 B2 | 9/2008 | Kothari |
| 7,459,402 B2 | 12/2008 | Doan et al. |
| 7,460,291 B2 | 12/2008 | Sampsell et al. |
| 7,566,664 B2 | 7/2009 | Yan et al. |
| 2001/0043171 A1 | 11/2001 | Van Gorkom et al. |
| 2002/0067446 A1 | 6/2002 | Wang |
| 2002/0070931 A1 | 6/2002 | Ishikawa |
| 2002/0114558 A1 | 8/2002 | Nemirovsky |
| 2002/0126364 A1 * | 9/2002 | Miles ............ 359/247 |
| 2002/0139981 A1 | 10/2002 | Young |
| 2002/0149721 A1 | 10/2002 | Minoura et al. |
| 2002/0167730 A1 | 11/2002 | Needham |
| 2003/0112507 A1 | 6/2003 | Divelbiss et al. |
| 2003/0123125 A1 | 7/2003 | Little |
| 2003/0128175 A1 | 7/2003 | Berstis |
| 2003/0189528 A1 | 10/2003 | Antila et al. |
| 2004/0051929 A1 | 3/2004 | Sampsell |
| 2004/0135947 A1 | 7/2004 | Jang et al. |
| 2004/0189588 A1 | 9/2004 | Dong et al. |
| 2004/0217919 A1 | 11/2004 | Pichi et al. |
| 2005/0002082 A1 | 1/2005 | Miles |
| 2005/0046919 A1 | 3/2005 | Taguchi et al. |
| 2005/0122294 A1 | 6/2005 | Ben-David et al. |
| 2005/0195370 A1 | 9/2005 | Gore |
| 2005/0225686 A1 | 10/2005 | Brummack et al. |
| 2005/0253820 A1 | 11/2005 | Horiuchi |
| 2006/0056000 A1 * | 3/2006 | Mignard ............ 359/245 |
| 2006/0066935 A1 | 3/2006 | Cummings et al. |
| 2006/0067651 A1 | 3/2006 | Chui |
| 2006/0077155 A1 | 4/2006 | Chui et al. |
| 2006/0077515 A1 | 4/2006 | Cummings |
| 2006/0082863 A1 | 4/2006 | Piehl et al. |
| 2006/0091824 A1 | 5/2006 | Pate et al. |
| 2006/0250326 A1 | 11/2006 | Wampler |
| 2006/0262562 A1 | 11/2006 | Fukasawa et al. |
| 2007/0042524 A1 | 2/2007 | Kogut et al. |
| 2007/0086078 A1 | 4/2007 | Hagood et al. |
| 2007/0229936 A1 | 10/2007 | Miles |
| 2007/0268201 A1 | 11/2007 | Sampsell et al. |
| 2008/0037093 A1 | 2/2008 | Miles |
| 2008/0088904 A1 | 4/2008 | Miles |
| 2008/0088911 A1 | 4/2008 | Miles |
| 2008/0088912 A1 | 4/2008 | Miles |
| 2008/0106782 A1 | 5/2008 | Miles |
| 2008/0112036 A1 | 5/2008 | Cummings |
| 2009/0103168 A1 | 4/2009 | Sampsell |

FOREIGN PATENT DOCUMENTS

| | | |
|---|---|---|
| EP | 1 439 515 | 7/2004 |
| EP | 1 640 770 | 3/2006 |
| EP | 1 640 779 | 3/2006 |
| EP | 1 847 864 | 10/2007 |
| JP | 04-309925 | 2/1992 |
| JP | 2002-062490 | 2/2000 |
| JP | 2002-221678 | 8/2002 |
| WO | WO 94/22045 | 9/1994 |
| WO | WO 00/11502 | 3/2000 |
| WO | WO 03/105198 | 12/2003 |
| WO | WO 2004/042687 | 5/2004 |

OTHER PUBLICATIONS

ISR and WO for PCT/US08/055829 filed Mar. 4, 2008.

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23. (1994).

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Miles, Interferometric modulation: MOEMS as an enabling technology for high performance reflective displays, Proceedings of SPIE, vol. 4985, pp. 131-139, 2003.

Austrian Search Report for U.S. Appl. No. 11/052,004 dated Jul. 1, 2005.

Extended European Search Report in App. No. 05255715.4 (Publication No. EP 1640780) dated Feb. 25, 2008.

* cited by examiner

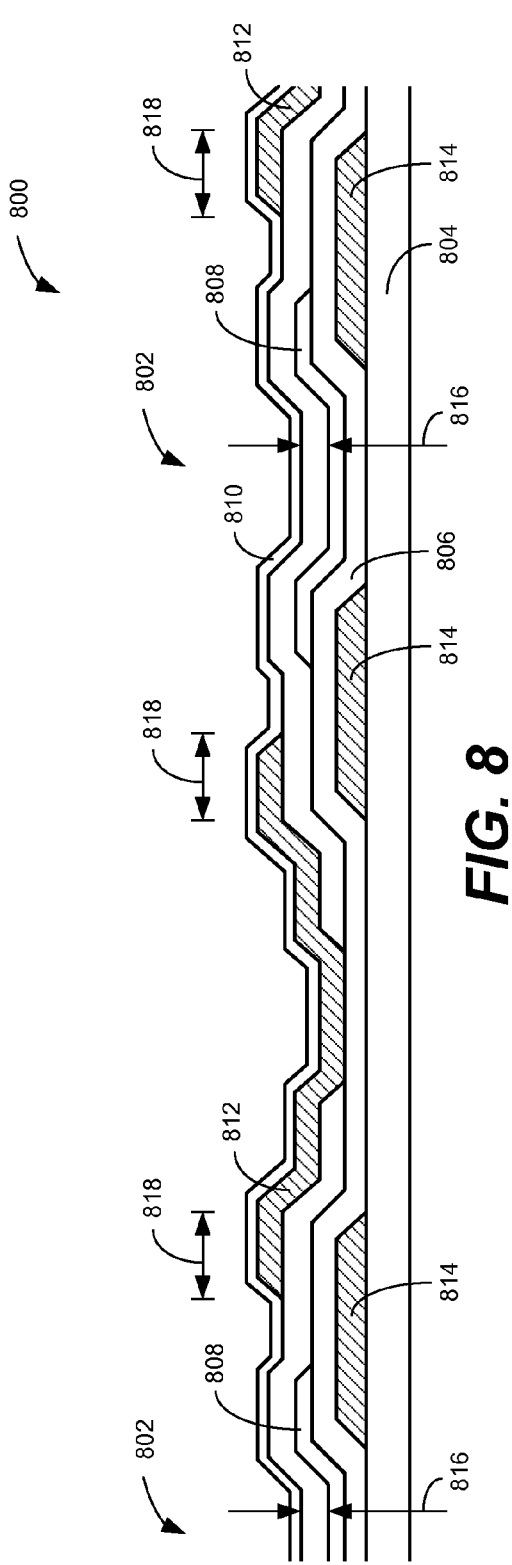
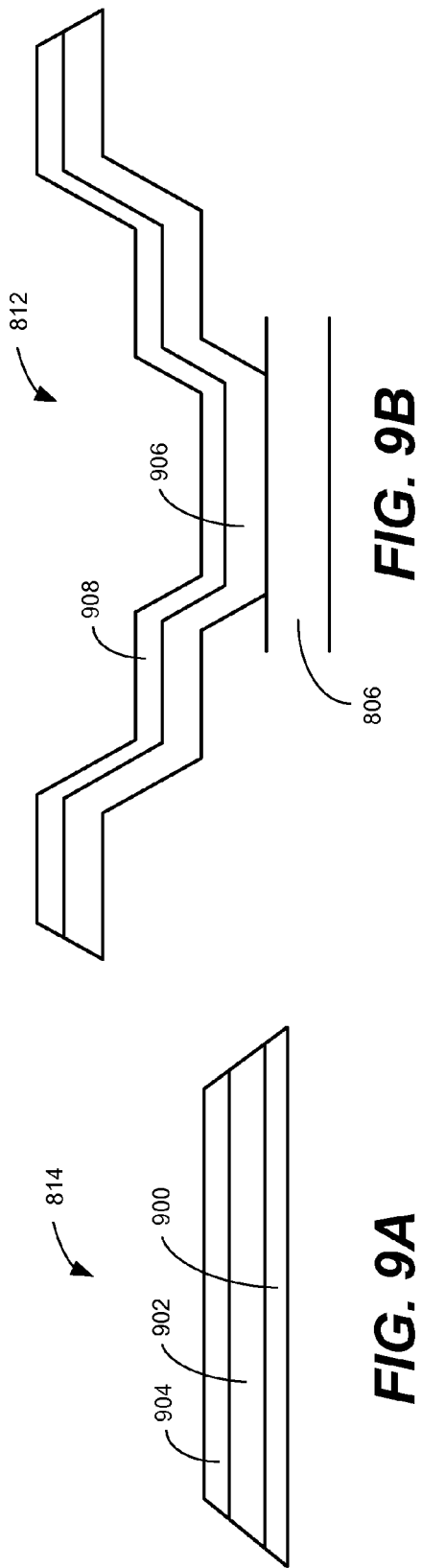
FIG. 8
FIG. 9A
FIG. 9B

METHOD AND APPARATUS FOR PROVIDING A LIGHT ABSORBING MASK IN AN INTERFEROMETRIC MODULATOR DISPLAY

FIELD OF THE INVENTION

The present invention relates generally to display devices, and more particularly to interferometric modulator display devices.

BACKGROUND OF THE INVENTION

Microelectromechanical systems (MEMS) include micromechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a movable reflective layer (also referred to as a mechanical layer herein) separated from the stationary layer by a transparent medium (e.g., an air gap). As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

Interferometric modulator displays typically include light absorbing areas (or light absorbing masks)—e.g., composed of black matrix—to improve a display contrast of the interferometric modulator displays. FIG. 1 illustrates a portion of a conventional interferometric modulator display 100 including a stationary layer 102 (formed on a substrate 104) and a movable reflective layer 106. As shown in FIG. 1, the interferometric modulator display 100 also includes a black matrix layer 108 formed on the substrate 104. The interferometric modulator display 100 further includes posts 110—formed over of the black matrix layer 108—that support the movable reflective layer 106. Formation of the posts 110 over the black matrix layer 108, however, typically causes a "launching" of the movable reflective layer 106 over the substrate 104 which can increase the size of an air gap 112 between the stationary layer 102 and the movable reflective layer 106. The increase in size of the air gap 112 can cause an undesirable shift in an optical response of an interferometric modulator display. Such a shift in optical response is noticeable especially in broadband white interferometric modulator displays which require a tight control over the size of air gaps.

BRIEF SUMMARY OF THE INVENTION

In general, in one aspect, this specification describes a microelectromechanical system (MEMS) including a transparent substrate, and a plurality of interferometric modulators. The plurality of interferometric modulators includes an optical stack coupled to the transparent substrate. The optical stack includes a first light absorbing area, a reflective layer over the optical stack, and one or more posts to support the reflective layer. Each of the one or more posts includes a second light absorbing area integrated in the post.

In general, in another aspect, this specification describes a method for providing light in an interferometric modulator device. The method includes providing a transparent substrate; forming a first light absorbing area on the transparent substrate; forming a conductive layer on the transparent substrate; forming a reflective layer over the conductive layer; and forming one or more posts to support the reflective layer. The one or more posts are formed over portions of the conductive layer that do not overlap with the first light absorbing area. Forming one or more posts includes integrating a second light absorbing area into the one or more posts.

Implementations may provide one or more of the following advantages. In one embodiment, a method of forming black matrix within an interferometric modulator display is provided that requires two less masking steps relative to conventional techniques. Moreover, there are fewer issues with regard to properly overlaying layers of a black matrix on top of one another as the method does not require a target mask, as is required in conventional techniques. In addition, the launching effect of the metallic membrane layer is reduced as, in one embodiment, an absorber layer is deposited within the posts so that the posts act as a black matrix layer.

The details of one or more embodiments are set forth in the accompanying drawings and the description below. Other features and advantages will be apparent from the description and drawings, and from the claims.

BRIEF DESCRIPTION OF THE DRAWINGS

FIG. 8 illustrates a cross-sectional view of an interferometric modulator display including light absorbing areas in accordance with one embodiment.

FIG. 9A illustrates a cross-section of a first black matrix layer within the interferometric modulator display of FIG. 8 in accordance with one embodiment.

FIG. 9B illustrates a cross-section of a support post within the interferometric modulator display of FIG. 8 in accordance with one embodiment.

Like reference symbols in the various drawings indicate like elements.

DETAILED DESCRIPTION OF THE INVENTION

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

As discussed above, conventional interferometric modulator displays typically include light absorbing areas—e.g., composed of black matrix—to improve a display contrast of the interferometric modulator displays. Black matrix layers within a conventional interferometric modulator display, however, generally cause a launching of the movable reflective layer within the interferometric modulator display, which distorts the optical response of the interferometric modulator display. Such a distortion in optical response is visually perceivable, for example, in broadband white interferometric modulator displays in that the color white is shifted to another color. Accordingly, this specification describes an improved method for fabricating an interferometric display device to reduce the launching of the moveable reflective layer caused by black matrix layers. In one embodiment, an interferometric modulator display is provided that includes black matrix layers that are integrated into one or more of the posts that support a moveable reflective layer within the interferometric modulator display.

Figure 1:
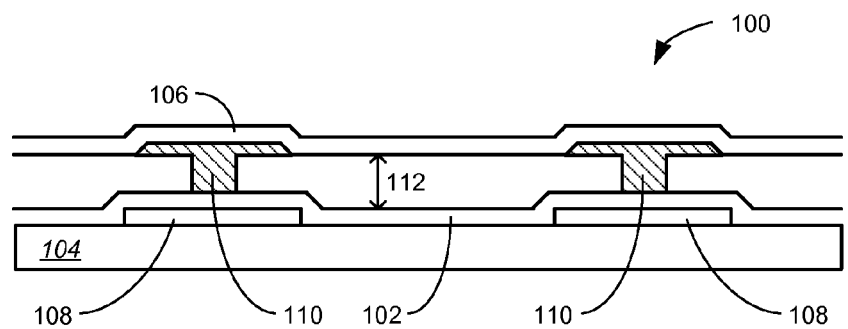
FIG. 1 illustrates a cross-section of a conventional interferometric modulator display including a black matrix layer.
Figure 2:
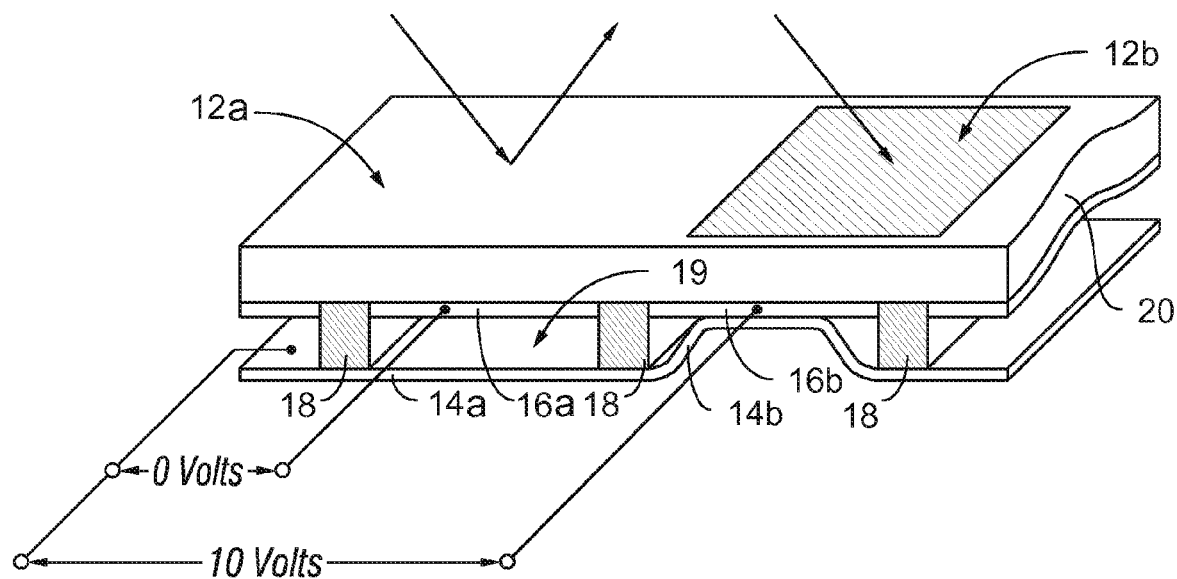
FIG. 2 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 2. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 2 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the fixed partially reflective layer. Incident light that reflects from the two layers interferes constructively or destructively depending on the position of the movable reflective layer, producing either an overall reflective or non-reflective state for each pixel.

The depicted portion of the pixel array in FIG. 2 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In one embodiment, the optical stack further includes a first black matrix layer, as discussed in greater detail below. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 2. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not shown) within the optical stack 16 may prevent shorting and control the separation distance between layers 14 and 16, as illustrated by pixel 12*b* on the right in FIG. 2. The behavior is the same regardless of the polarity of the applied potential difference. In this way, row/column actuation that can control the reflective vs. non-reflective pixel states is analogous in many ways to that used in conventional LCD and other display technologies.

Figure 3:
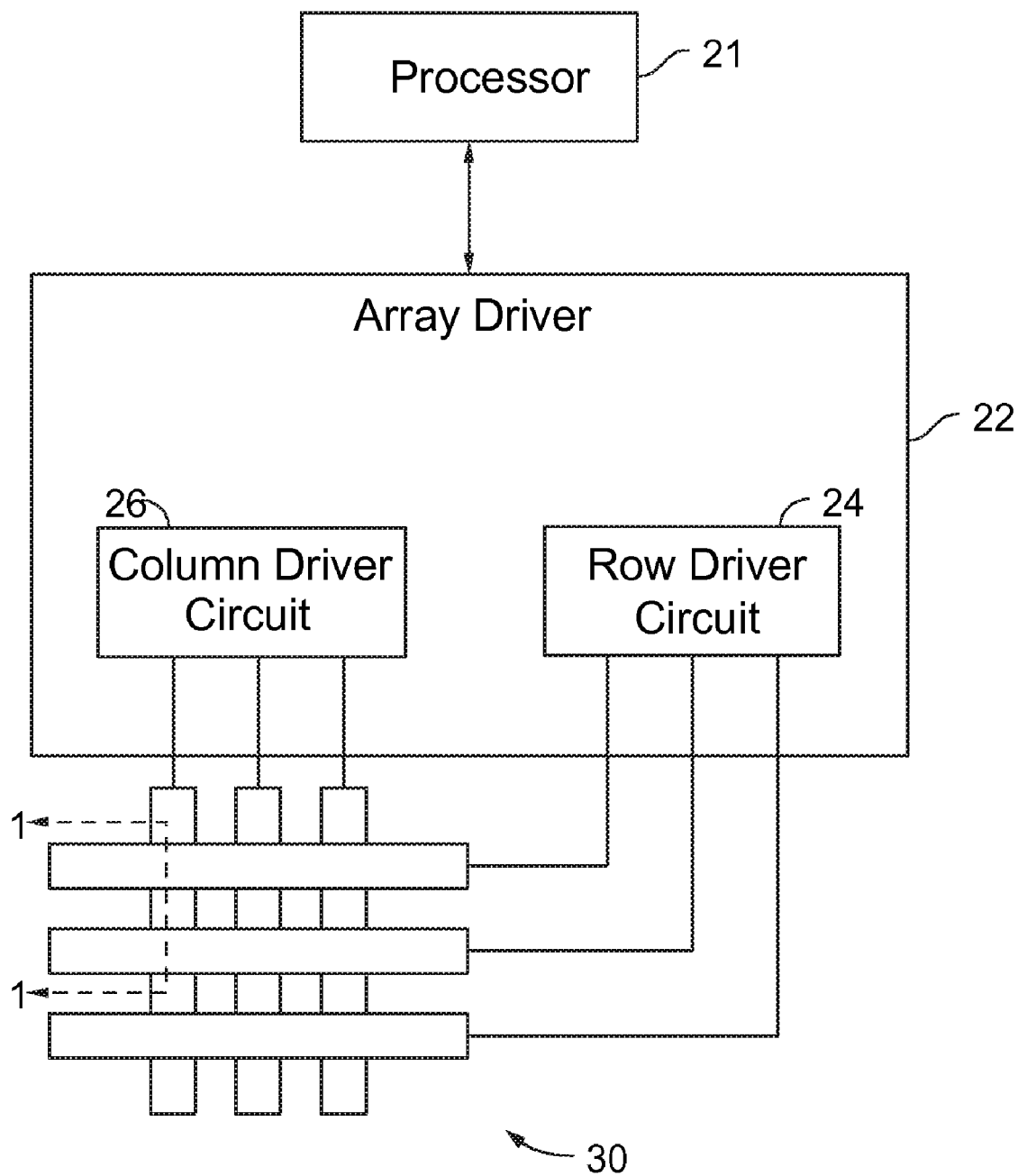
FIG. 3 is a system block diagram illustrating one embodiment of an electronic device incorporating a 3×3 interferometric modulator display.
Figures 4, 5:
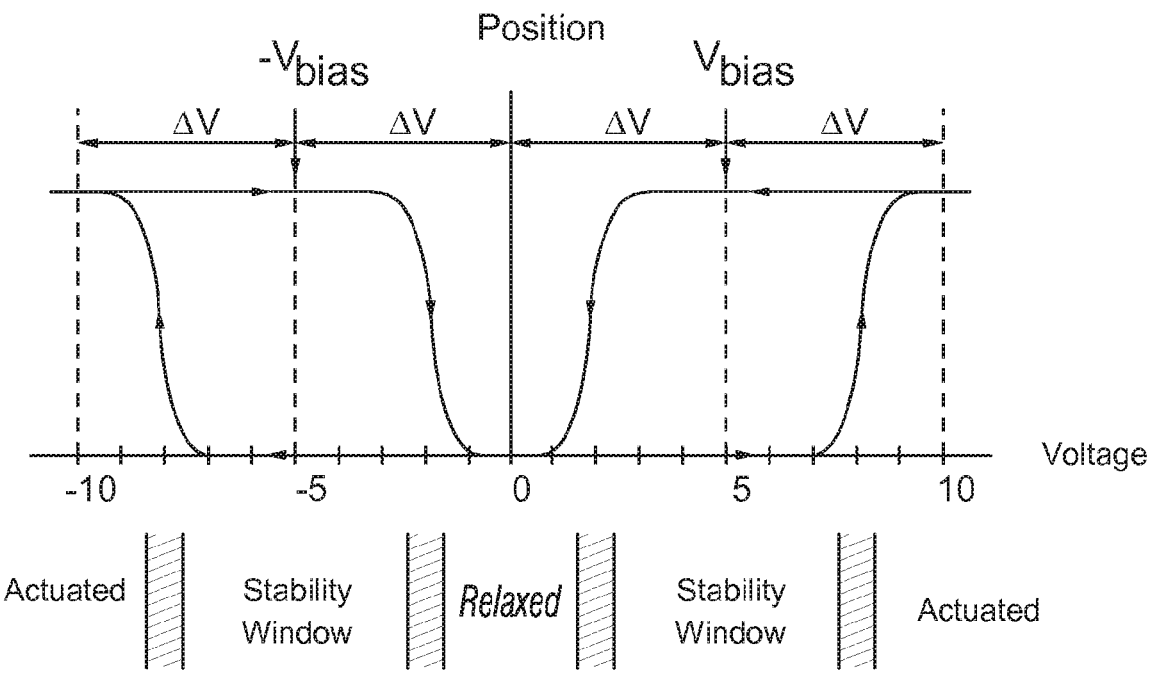
FIG. 4 is a diagram of movable mirror position versus applied voltage for one exemplary embodiment of an interferometric modulator of FIG. 1.
FIG. 5 is an illustration of a set of row and column voltages that may be used to drive an interferometric modulator display.

FIGS. 3 through 4 illustrate one exemplary process and system for using an array of interferometric modulators in a display application.

FIG. 3 is a system block diagram illustrating one embodiment of an electronic device that may incorporate aspects of the invention. In the exemplary embodiment, the electronic device includes a processor 21 which may be any general purpose single-chip or multi-chip microprocessor such as an ARM (Advanced RISC Machine), Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 2 is shown by the lines 1-1 in FIG. 3. For MEMS interferometric modulators, the row/column actuation protocol may take advantage of a hysteresis property of these devices illustrated in FIG. 4. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 4, the movable layer does not relax completely until the voltage drops below 2 volts. There is thus a range of voltage, about 3 to 7 V in the example illustrated in FIG. 4, where there exists a window of applied voltage within which the device is stable in either the relaxed or actuated state. This is referred to herein as the "hysteresis window" or "stability window."

For a display array having the hysteresis characteristics of FIG. 4, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 2 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figure 6A:
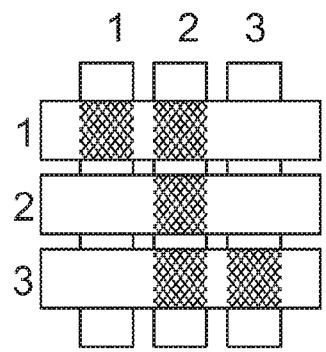
FIGS. 6A and 6B illustrate one exemplary timing diagram for row and column signals that may be used to write a frame of display data to the 3×3 interferometric modulator display of FIG. 2.
Figure 6B:
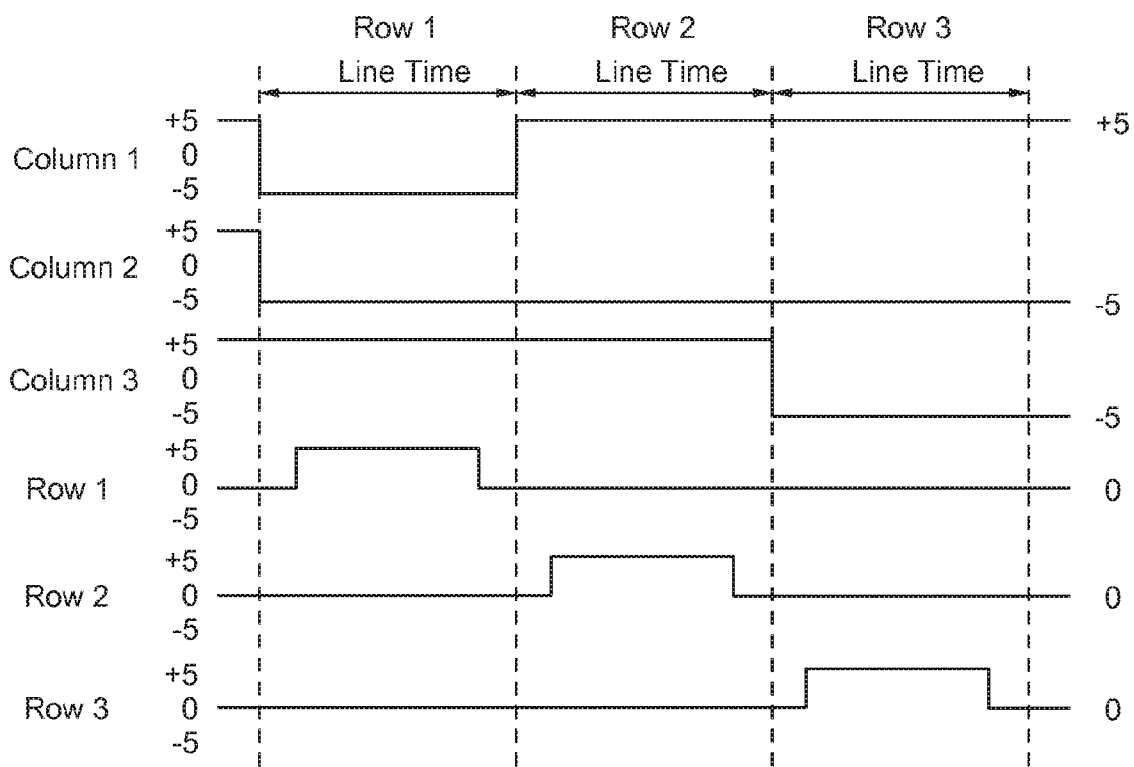

FIGS. 5 and 6A-6B illustrate one possible actuation protocol for creating a display frame on the 3×3 array of FIG. 3. FIG. 5 illustrates a possible set of column and row voltage levels that may be used for pixels exhibiting the hysteresis curves of FIG. 4. In the embodiment shown in FIG. 5, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 5, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 6B is a timing diagram showing a series of row and column signals applied to the 3×3 array of FIG. 3 which will result in the display arrangement illustrated in FIG. 6A, where actuated pixels are non-reflective. Prior to writing the frame illustrated in FIG. 6A, the pixels can be in any state, and in this example, all the rows are at 0 volts, and all the columns are at +5 volts. With these applied voltages, all pixels are stable in their existing actuated or relaxed states.

In the frame shown in FIG. 6A, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 6A. After writing the frame, the row potentials are zero, and the column potentials can remain at either +5 or −5 volts, and the display is then stable in the arrangement of FIG. 6A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 7A:
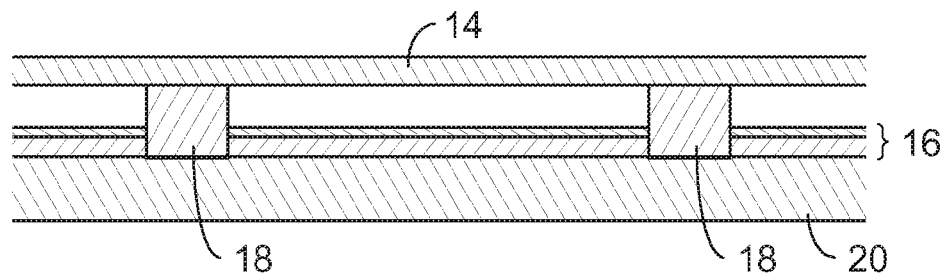
FIG. 7A is a cross-section of an interferometric modulator of FIG. 2.
Figure 7B:
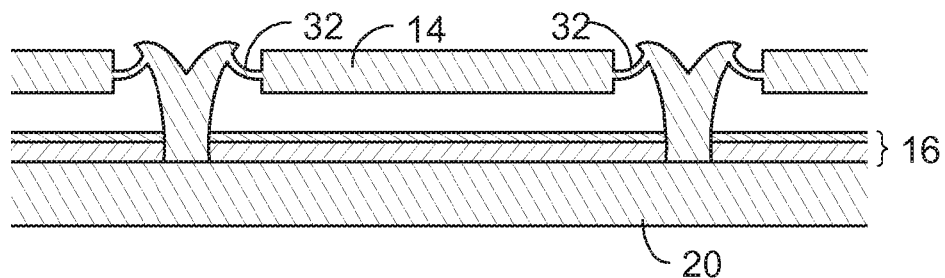
FIGS. 7B-7E illustrate alternative embodiments of an interferometric modulator.
Figure 7C:
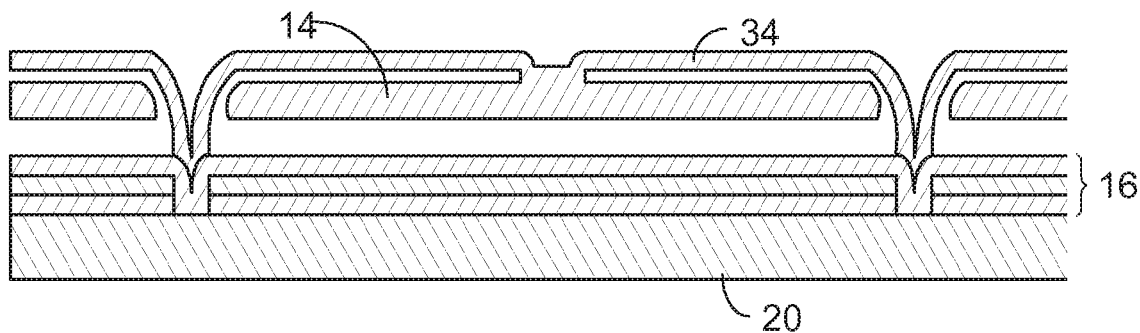
Figure 7D:
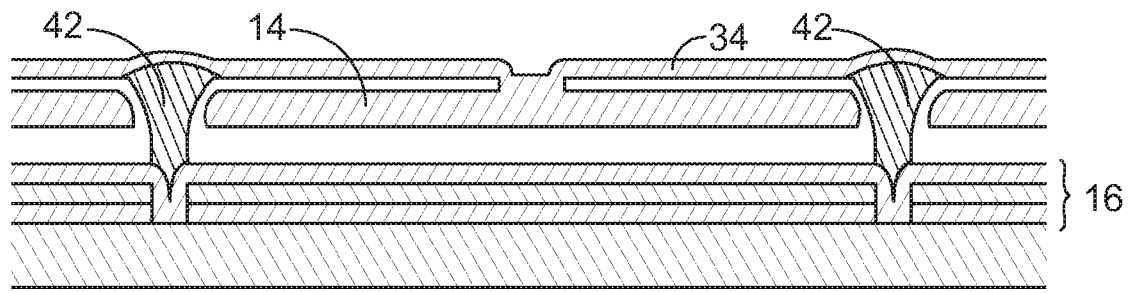
Figure 7E:
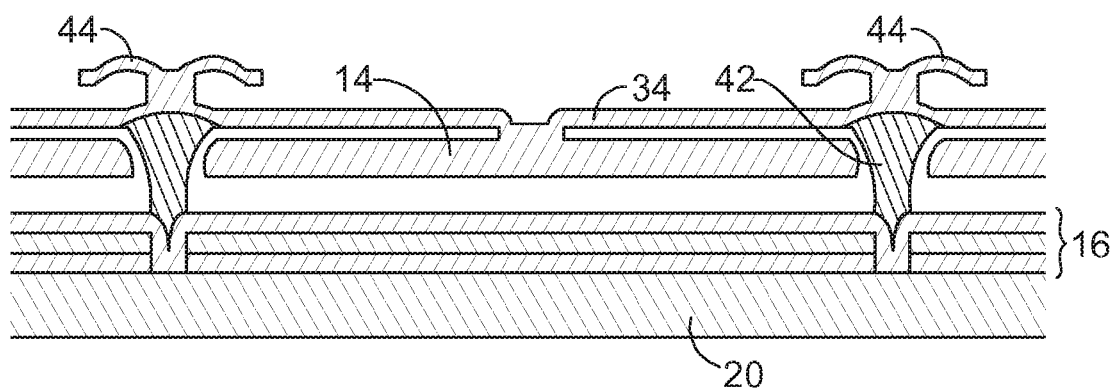

FIG. 7A is a cross section of the embodiment of FIG. 2, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are referred to herein as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20. In general, any of the embodiments illustrated in FIGS. 7A-7E can include a black matrix layer integrated within one or more support posts, as described in greater detail below.

FIG. 8 illustrates a cross-section of an interferometric modulator display 800 including a plurality of interferometric modulators 802 in accordance with one embodiment. As shown in FIG. 8, the interferometric modulator display 800 includes a substrate 804, a conductive layer—e.g., formed of a dielectric layer 806 and an electrode layer 808. The interferometric modulator display 800 further includes a mechanical layer 810 and a plurality of support posts 812 to support the mechanical layer 810. Unlike a conventional interferometric modulator display that may include a single black matrix layer formed underneath each support post, the interferometric modulator display 800 includes black matrix layers that are separated—i.e., a first black matrix layer 814 is formed on the substrate 804, and a second black matrix layer integrated into the support posts 812. Integration of a black matrix layer into the support posts—rather than placement of a black matrix layer underneath a support post—reduces a launching of the mechanical layer and, therefore, a tighter control of an air gap (e.g., air gap 816) within an interferometric modulator can be attained. In one embodiment, the separate black matrix layers include regions that overlap, as indicated by arrows 818. The overlapping regions of the separate black matrix layers prevent any reflection issues.

FIGS. 9A-9B respectively illustrate a cross-sectional view of a first black matrix layer 814 and a support post 812 (including a second black matrix layer) of the interferometric modulator display 800 (FIG. 8) in accordance with one embodiment. As shown in FIG. 9A, (in one embodiment) the first black matrix layer 814 includes an absorber layer 900, a dielectric layer 902, and a reflective layer 904. The absorber layer 900 can be composed of (e.g.) chromium (Cr) or molybdenum-chromium (MoCr), the dielectric layer 902 can be composed of (e.g.) silicon dioxide (SiO2) or Aluminum oxide (Al2O3) or SiNx, and the reflective layer 904 can be composed of (e.g.) aluminum (Al) or nickel (Ni) or a highly reflective material (e.g. Silver). In one embodiment, the absorber layer 900 has a thickness (or height) of approximately 80 Å, the dielectric layer 902 has a thickness of approximately 800 Å, and the reflective layer 904 has a thickness of approximately 300 Å (300 Å for aluminum and 500 Å for nickel, for example). As shown in FIG. 9B, in one embodiment, the support post 812 comprises a first dielectric layer 806, an absorber layer 906, and a second dielectric layer 908. The first dielectric layer 806 can be composed of silicon dioxide (Si02) or silicon nitride (SiNx), and have a suitable thickness that is sufficient to support the mechanical layer 810 (FIG. 8). The absorber layer 906 can be composed of (e.g.) chromium (Cr) or molybdenum-chromium (MoCr). The second dielectric layer 908 can be composed of (e.g.) silicon dioxide (SiO2) or Aluminum oxide (Al2O3). In one embodiment, the absorber layer 906 and the second dielectric layer 908 (of the support post 812) respectively have a thickness that is substantially the same as that of the absorber layer 900 and the dielectric layer 902 within the first black matrix 814 (FIG. 9A).

Figure 10:
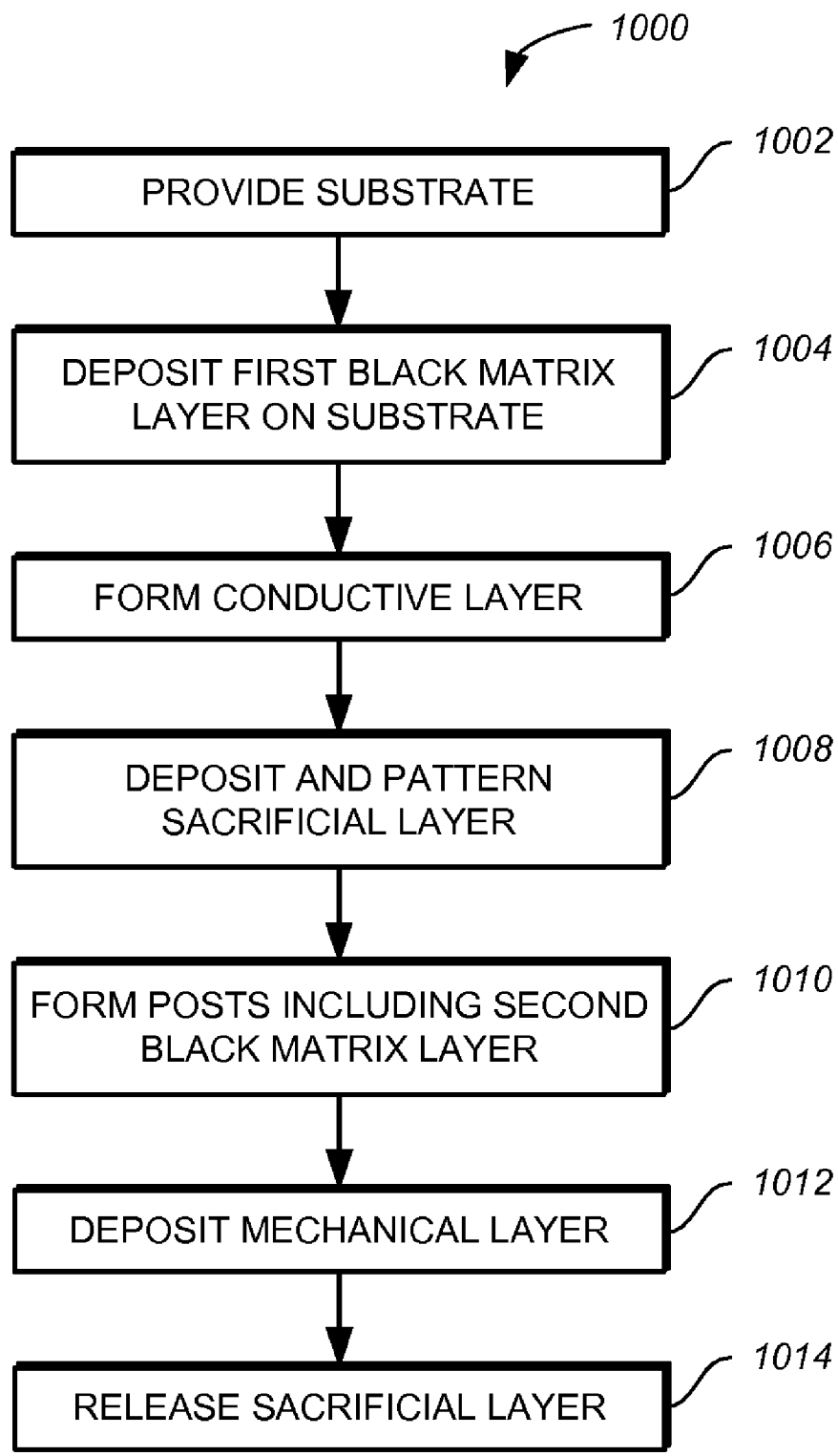
FIG. 10 illustrates a flow diagram of a process for manufacturing an interferometric modulator display according to one embodiment.
Figure 11A:
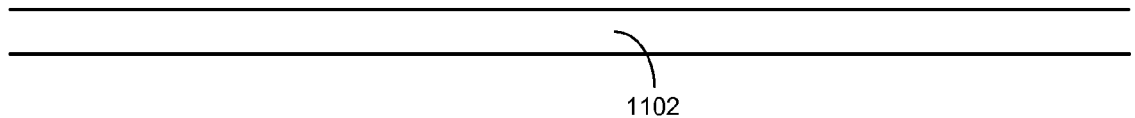
FIGS. 11A-11G illustrate the process of manufacturing an interferometric modulator display according to the process of FIG. 10.
Figure 11B:
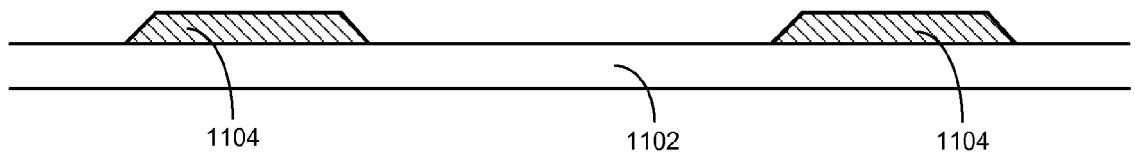
Figure 11C:
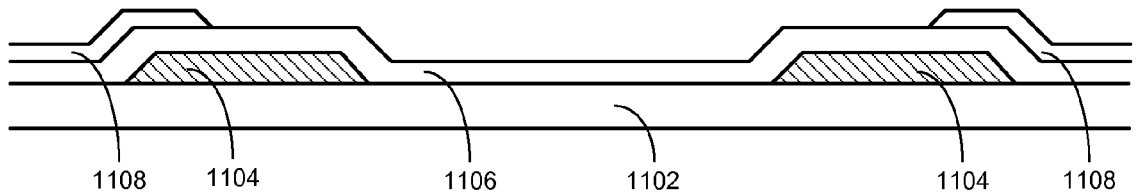
Figure 11D:
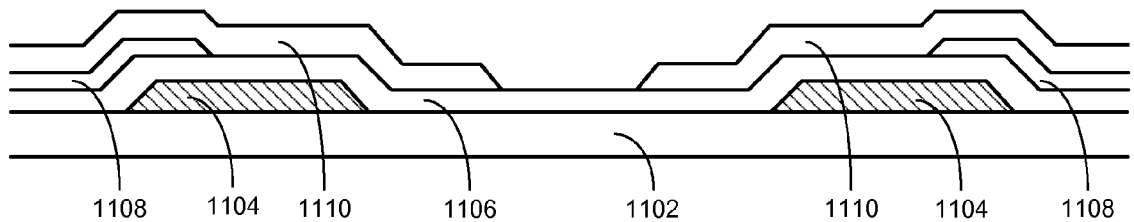

FIG. 10 illustrates a process 1000 of fabricating an interferometric modulator display (e.g., interferometric modulator display 800) in accordance with one embodiment. The process 1000 begins with providing a substrate (block 1002). Referring to the example of FIG. 11A, a substrate 1102 is provided. The substrate 1102 can be transparent. Alternatively, the substrate 1102 can be non-transparent. In one embodiment, the substrate 1102 comprises glass. A first black matrix layer is deposited and patterned on the substrate (block 1004). As shown in FIG. 11B, a first black matrix layer 1104 is deposited over the substrate 1102. In one embodiment, the first black matrix layer includes an absorber layer, a dielectric layer, and a reflective layer, as discussed in greater detail above. In one embodiment, the first black matrix layer has a thickness of substantially 800 Å-1000 Å. A conductive layer is formed (block 1006). As shown in FIG. 11C, a conductive layer—including a dielectric layer 1106 and an electrode layer 1108—is formed over the substrate 1102 and the first black matrix layer 1104. More generally, the conductive layer comprises one or more layers and/or films. For example, in one embodiment the conductive layer comprises a conductive layer (e.g., indium tin oxide (ITO)) and a partially reflective layer (e.g., chromium). A sacrificial layer is deposited and patterned (block 1008). Referring to FIG. 11D, a sacrificial layer 1110 is deposited over the conductive layer. In one embodiment, the sacrificial layer 1110 comprises molybdenum. In one embodiment, the height of the sacrificial layer 1110 determines the amount of spacing between the first conductive layer (or conductive plate) and a second conductive plate (e.g., a mechanical layer discussed below). In one embodiment, the height of the sacrificial layer 1110 is substantially 1800 Å-2100 Å.

Figure 11E:
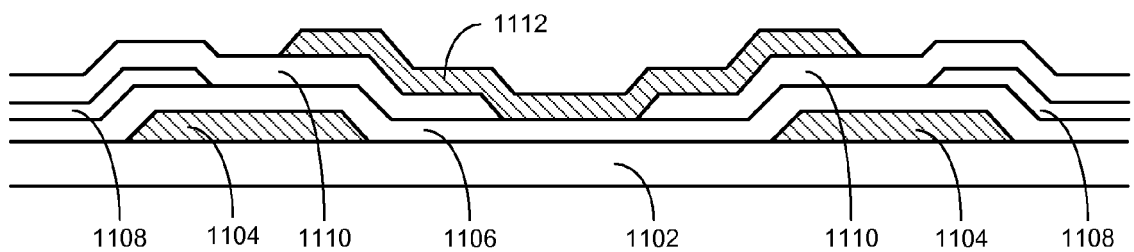
Figure 11F:
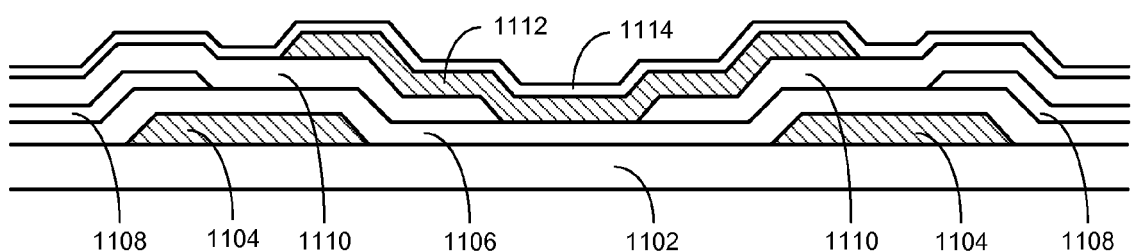
Figure 11G:
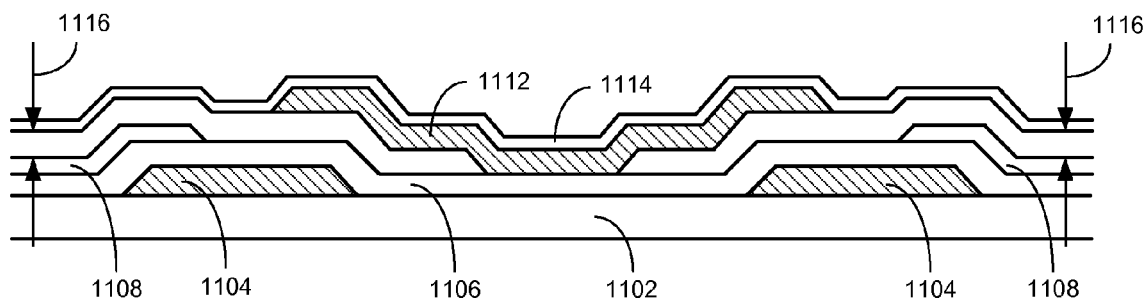

A plurality of support posts are formed, in which each support post includes a second black matrix layer (block 1010). As shown by FIG. 11E, a support post 1112 is formed within the etched portion of the sacrificial layer 1110 of the interferometric modulator display. In one embodiment, the support post 1112 comprises an absorber layer, a dielectric layer, and a reflective layer, as discussed above. In one embodiment, the support posts are formed using photolithography and etch techniques to remove unwanted portions of the material that comprise the support posts. In one embodiment, the support posts 1112 are formed over portions of the conductive layer that do not overlap with the first black matrix layer 1104, as shown in FIG. 11E. A mechanical layer is deposited (block 1012). Referring to the example of FIG. 11F, a mechanical layer 1114 is formed over the sacrificial layer 1110 and the support post 1112. In one embodiment, the mechanical layer 914 comprises a movable reflective layer as discussed above. In one embodiment, the mechanical layer 1114 comprises aluminum/nickel, and has a height substantially in the range of 1100 Å-1300 Å. The sacrificial layer is released (block 1014). Referring to FIG. 11G, the sacrificial layer 1110 is released to form an air gap 1116 between the mechanical layer 1114 and the conductive layer. The sacrificial layer 1110 can be released through one or more etch holes formed through the mechanical layer 1114. The one or more etch holes can be created after deposition of the mechanical layer 1114.

Figure 12A:
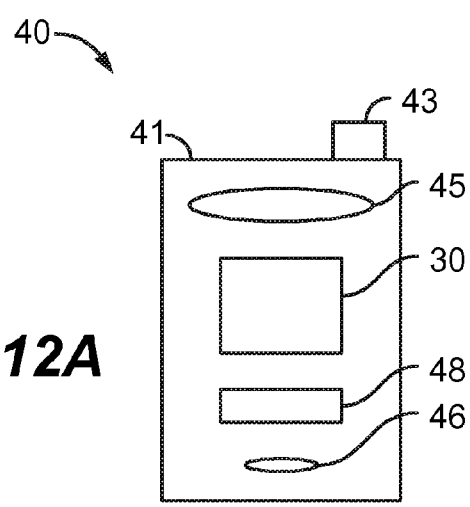
FIGS. 12A and 12B are system block diagrams illustrating an embodiment of a visual display device comprising a plurality of interferometric modulators.
Figure 12B:
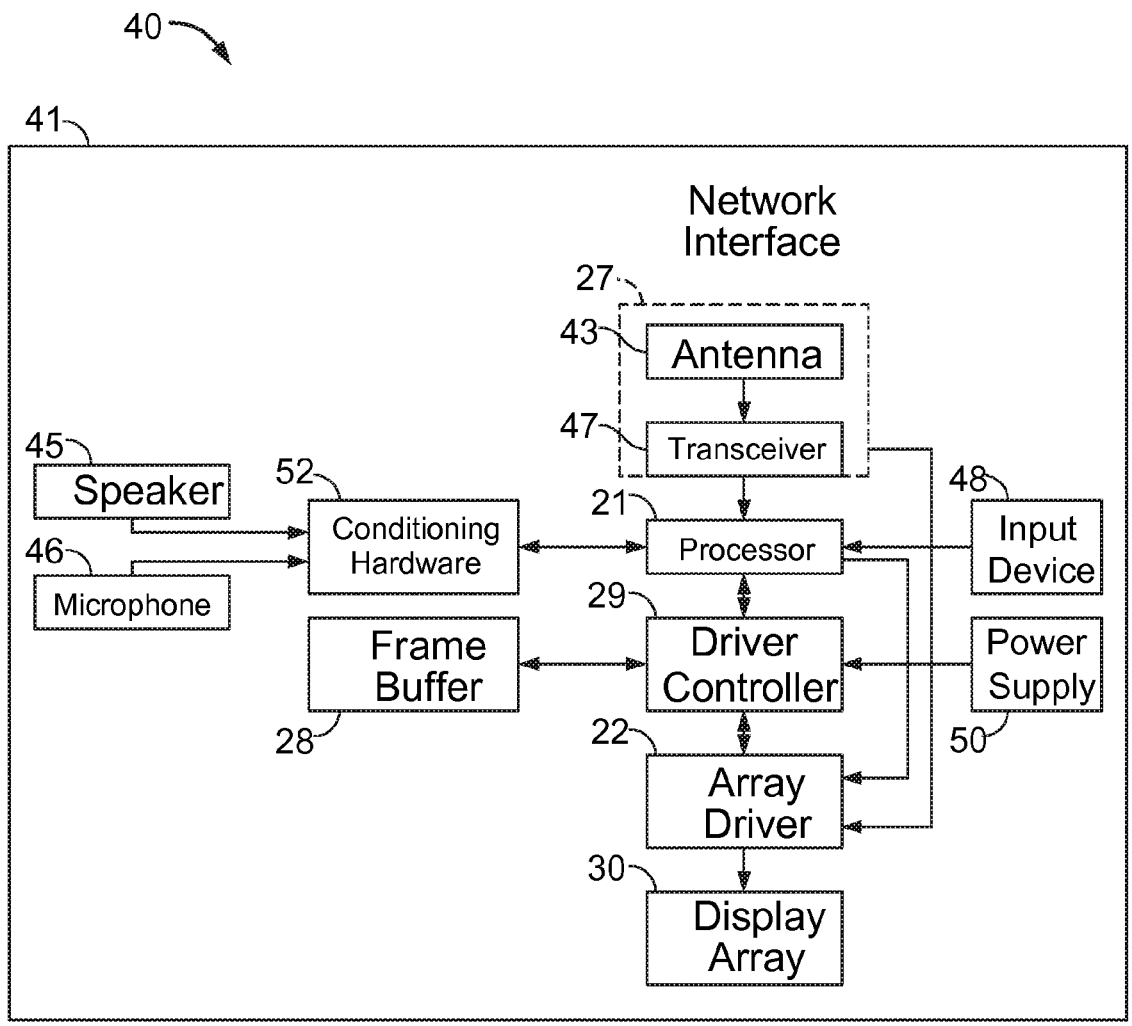

FIGS. 12A and 12B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 12B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display driver). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some embodiments control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Various implementations of an interferometric modulator display have been described. Nevertheless, one or ordinary skill in the art will readily recognize that there that various modifications may be made to the implementations, and any variation would be within the spirit and scope of the present invention. For example, the process steps described above in connection with FIG. 10 may be performed in a different order and still achieve desirable results. Further, light absorbing layers other than black matrix layers can be implemented—e.g., light absorbing material composed of, for example, photo resist, polymer, or multiple layers consisting of absorber/dielectric layer/reflector. Accordingly, many modifications may be made by one of ordinary skill in the art without departing from the scope of the following claims.

What is claimed is:

1. An electromechanical system comprising:
a transparent substrate; and
a plurality of interferometric modulators comprising:
an optical stack coupled to the transparent substrate, the optical stack comprising:
a first light absorbing layer; and
a conducting layer comprising a partially reflective layer, said conducting layer separate from the first light absorbing layer;
a reflective layer over the optical stack; and
one or more posts to support the reflective layer, each of the one or more posts including a second light absorbing layer integrated in the post,
wherein the second light absorbing layer is separate from the first light absorbing layer, and
wherein a portion of the second light absorbing layer within a given post extends over a portion of the first light absorbing layer within the optical stack such that the portion of the second light absorbing layer overlaps the portion of the first light absorbing layer.

2. The system of claim 1 wherein:
the first light absorbing layer comprises a first black matrix layer; and
the second light absorbing layer comprises a second black matrix layer.

3. The system of claim 2, wherein:
the first black matrix layer comprises a first absorber layer, a first dielectric layer, and a first reflective layer; and
the second black matrix layer comprises a second absorber layer and a second dielectric layer.

4. The system of claim 3, wherein:
the first absorber layer has substantially a same thickness as the second absorber layer; and
the first dielectric layer has substantially a same thickness as the second dielectric layer.

5. The system of claim 1 as a display system, further comprising:
a display including the system;
a processor that is in electrical communication with the display, the processor being configured to process image data; and
a memory device in electrical communication with the processor.

6. The display system of claim 5, further comprising:
a driver circuit configured to send at least one signal to the display.

7. The display system of claim 6, further comprising:
a controller configured to send at least a portion of the image data to the driver circuit.

8. The display system of claim 5, further comprising:
an image source module configured to send the image data to the processor.

9. The display system of claim 8, wherein the image source module comprises at least one of a receiver, transceiver, and transmitter.

10. The display system of claim 5, further comprising:
an input device configured to receive input data and to communicate the input data to the processor.

11. The system of claim 1, wherein the first light absorbing layer comprises a light absorbing material selected from a group consisting of photo resist and polymer.

12. The system of claim 1, wherein the second light absorbing layer comprises a light absorbing material selected from a group consisting of photo resist and polymer.

13. An electromechanical system comprising:
a means for transmitting light; and
means for modulating light, comprising:
first means for absorbing light coupled to the transmitting means;
a means for conducting electricity, said electricity conducting means comprising a means for partially reflecting light, said electricity conducting means separate from the first light absorbing means;
means for reflecting light, the reflecting means over the first absorbing means; and
means for supporting the reflecting means, said supporting means comprising a second means for absorbing light, wherein the second absorbing means is integrated in the supporting means,
wherein the second absorbing means is separate from the first absorbing means, and wherein a portion of the second light absorbing means within the supporting means extends over a portion of the first light absorbing means within the optical stack means such that a portion of the second light absorbing means overlaps a portion of the first light absorbing means.

14. The system of claim 13, wherein:
the first absorbing means comprises a first black matrix layer; and
the second absorbing means comprises a second black matrix layer.

15. The system of claim 14, wherein:
the first black matrix layer comprises a first absorber layer, a first dielectric layer, and a first reflective layer; and
the second black matrix layer comprises a second absorber layer and a second dielectric layer.

16. The system of claim 15, wherein:
the first absorber layer has substantially a same thickness as the second absorber layer; and
the first dielectric layer has substantially a same thickness as the second dielectric layer.

17. The system of claim 13, wherein the transmitting means comprises a transparent substrate.

18. The system of claim 13, wherein the first absorbing means comprises an optical stack comprising a first light absorbing layer, the supporting means comprises one or more posts, and the second absorbing means comprises a second light absorbing layer.

19. The system of claim 13, wherein the first absorbing means comprises a light absorbing material selected from a group consisting of photo resist and polymer.

20. The system of claim 13, wherein the second absorbing means comprises a light absorbing material selected from a group consisting of photo resist and polymer.

21. A method for forming an electromechanical system, the method comprising:
providing a transparent substrate;
forming a first light absorbing layer on the transparent substrate;
forming a conducting layer including a partially reflective layer on the transparent substrate, the conducting layer separate from the first light absorbing layer;
forming a reflective layer over the conducting layer; and
forming one or more posts to support the reflective layer, the one or more posts being formed over the transparent substrate and over portions of the conducting layer that do not overlap with the first light absorbing layer,
wherein forming one or more posts includes integrating a second light absorbing layer into the one or more posts,
wherein the second light absorbing layer is separate from the first light absorbing layer, and
wherein a portion of the second light absorbing layer extends over a portion of the first light absorbing layer such that a portion of the second light absorbing layer overlaps a portion of the first light absorbing layer.

22. The method of claim 21, wherein:
forming a first light absorbing layer on the transparent substrate comprises forming
a first black matrix layer on the transparent substrate; and
integrating a second light absorbing layer into the one or more posts comprises integrating a second black matrix layer into the one or more posts.

23. An interferometric modulator display device manufactured in accordance with the method of claim 21.

24. A method of modulating light, the method comprising:
providing an electromechanical system comprising:
a transparent substrate; and
a plurality of modulators comprising an optical stack, a reflective layer over the optical stack, and one or more posts supporting the reflective layer over the optical stack, wherein the optical stack comprises:
a first light absorbing layer;
a conducting layer including a partially reflective layer, said conducting layer separate from the partially reflective layer;
and the one or more posts comprises a second light absorbing layer integrated in the one or more posts, wherein the second light absorbing layer is separate from the first light absorbing layer;
transmitting light through the transparent substrate and the optical stack, the light irradiating the reflective layer; and
moving the reflective layer relative to the optical stack.

25. An electromechanical system comprising:
a transparent substrate; and
a plurality of interferometric modulators comprising:
an optical stack coupled to the transparent substrate, the optical stack including a first light absorbing layer;
a reflective layer over the optical stack; and
one or more posts to support the reflective layer, each of the one or more posts including a second light absorbing layer integrated in the post,
wherein the second light absorbing layer is separated from the first light absorbing layer by an air gap, and
wherein a portion of the second light absorbing layer within a given post extends over a portion of the first light absorbing layer within the optical stack such that the portion of the second light absorbing layer overlaps the portion of the first light absorbing layer.

* * * * *